Figure 11:
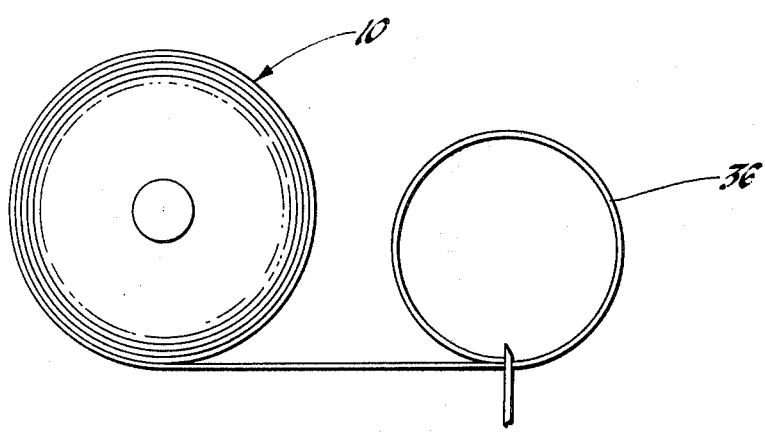

United States Patent [19]

Nels

[11] 4,406,394

[45] Sep. 27, 1983

[54] METHOD OF FRICTION BAND MANUFACTURE

[75] Inventor: Terry E. Nels, Xenia, Ohio

[73] Assignee: General Motors Corporation, Detroit, Mich.

[21] Appl. No.: 210,779

[22] Filed: Nov. 28, 1980

[51] Int. Cl.³ .................. B23K 31/00; B23P 15/18
[52] U.S. Cl. ............................. 228/170; 228/173 C
[58] Field of Search ................... 228/170, 173 C; 188/259

[56] References Cited

U.S. PATENT DOCUMENTS

| | | | |
|---|---|---|---|
| 2,867,898 | 1/1959 | Vosler et al. | 29/416 |
| 3,367,466 | 2/1968 | Lang | 188/259 |
| 3,531,849 | 10/1970 | Bishop et al. | 29/428 |

Primary Examiner—Kenneth J. Ramsey
Attorney, Agent, or Firm—Donald F. Scherer

[57] ABSTRACT

A double wrap brake band is manufactured from three substantially equal length strips of metal which are bonded together in a "Y" or tuning fork shape. The bonded straps are then formed into a cylindrical shape and friction material is bonded to the inner surfaces. Operating lugs are secured at the outer free end of each strap. In the alternative, the operating lugs can be formed integral with the strap or otherwise secured to the strap either prior to or subsequent to the bonding of the straps. The lugs can be formed integral with their respective strap by deformation of the strap material. The double wrap band can also be manufactured by assembling three pre-shaped hoop members. The hoops are assembled coaxially and have an open face which is angularly displaced from the hoop adjacent thereto. The adjacent hoops are secured by welding or using a tie bar at the adjacent surfaces between the open ends.

2 Claims, 16 Drawing Figures

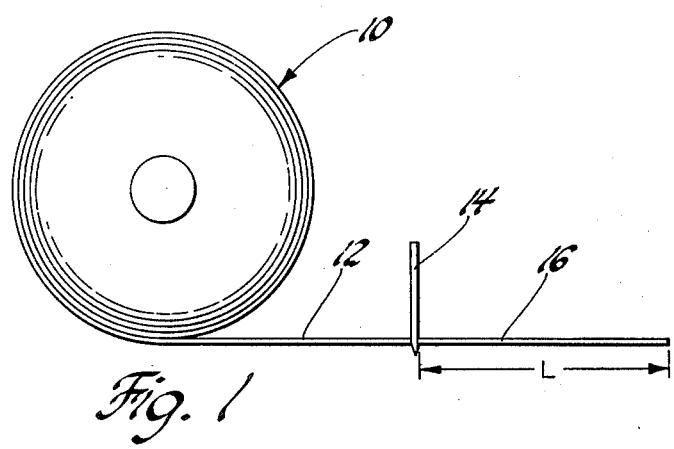
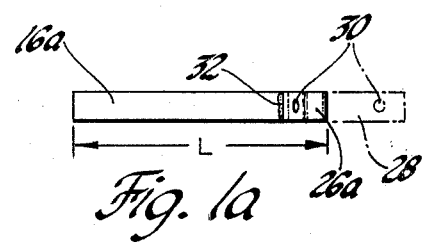
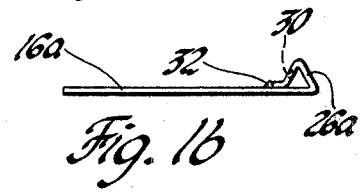
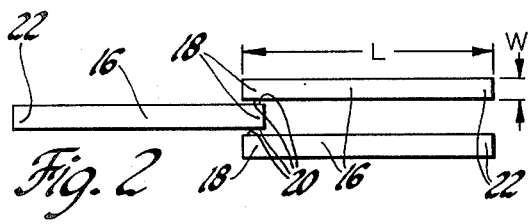
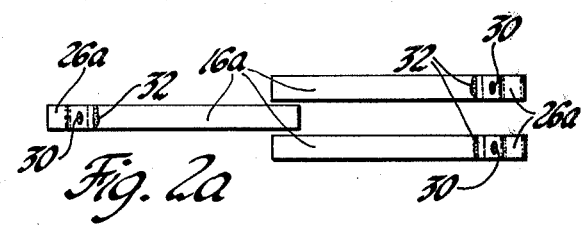
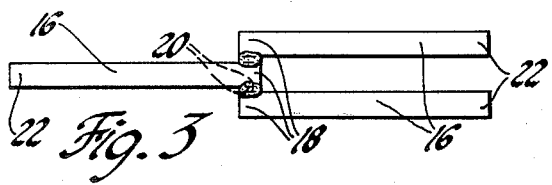
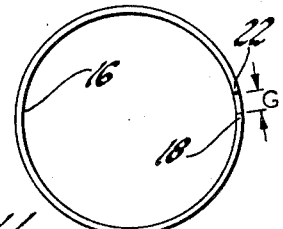
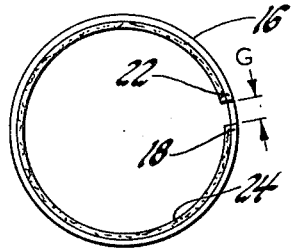
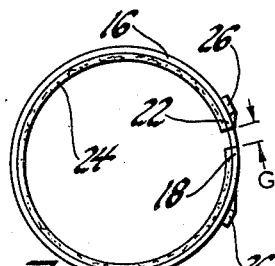
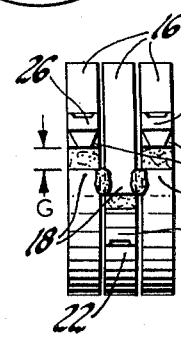
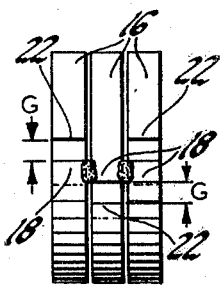
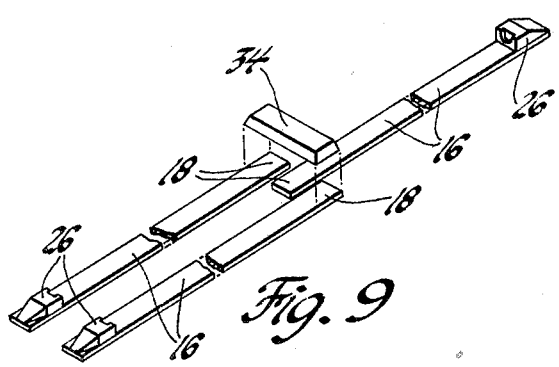
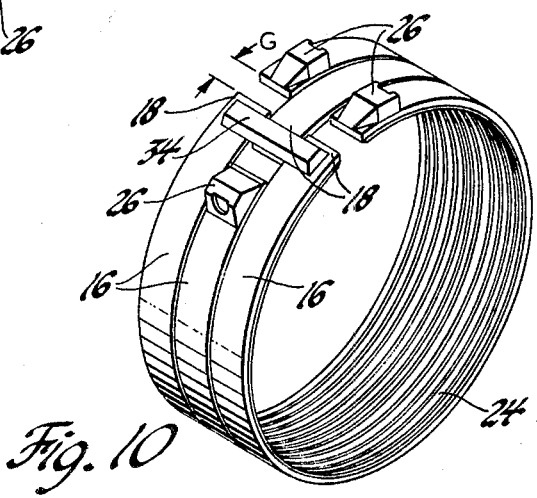

METHOD OF FRICTION BAND MANUFACTURE

This invention relates to brake bands and more particularly to double wrap brake bands and the method of making said bands.

Prior art multiwrap brake bands have been manufactured in accordance with U.S. Pat. No. 3,531,849 issued to Bishop et al. on Oct. 6, 1970, and U.S. Pat. No. 2,867,898 issued to Vosler et al. on Jan. 13, 1959. U.S. Pat. No. 3,531,849 teaches the use of a tuning fork shaped stamping which is then formed into a cylindrical multiwrap band. This process requires that a stamping machine of significantly large capacity be utilized such that the entire tuning fork shape can be blanked at one time. This requires a significant investment in machine tools and a significant amount of energy to stamp the tuning fork shape.

U.S. Pat. No. 2,867,898 utilizes a single band member which is formed into a substantially cylindrical member and has a tie band with integral lugs welded in place in the cylindrical member. The single band must then be pierced and cut to form a multiwrap arrangement. It is again evident that such a process requires a significant investment in tooling. Also a significant amount of energy usage is necessary during the process.

The present invention uses a simple shearing operation to form the separate strap lengths which are then bonded to form a "Y" or tuning fork shape. The bonding can be accomplished by a conventional welding operation. The shearing operation is performed by a very simple machine tool which need only sever a predetermined length of coil strip. Since the coil strip is established in a predetermined width, other blanking or cutting operations are not necessary. From a review of the prior art, it will be evident that the width of the strap used in the present process need only be ⅓ the width of the strap used in either of the aforementioned processes. This will obviously reduce the weight of the coil strip which must be placed on the shearing machine.

It is an object of this invention to provide an improved method of making a double wrap brake band wherein the basic band structure is formed by joining three equal length straps or hoops in a cylindrical shape with the central strap or hoop having a free end interjacent the connected ends of the outer straps.

It is another object of this invention to provide an improved method of making a double wrap band wherein open ended or C-shaped hoops are formed directly from coil stock material after which three hoops are aligned coaxially with the open section of the outer hoops being angularly displaced from the central hoop. The three hoops are then joined by welding adjacent members between their respective open ends such that the central hoop has a free end interjacent the outer hoops and angularly displaced from the respective free ends of the outer hoops.

It is a further object of this invention to provide an improved method of making a double wrap brake band wherein the basic band structure is formed by joining three equal length straps in a tuning fork shape after which the straps are formed into a cylindrical shape with the central strap being disposed interjacent the outer straps.

It is a still further object of this invention to provide an improved method of making a double wrap brake band wherein straps are sheared in equal length from a strip of material after which three of the straps are disposed with their longitudinal axis being parallel and with one strap central to the remaining straps such that one end of the central strap is disposed between an end of each of the remaining straps. The straps are then joined at their adjacent ends followed by forming operation which places the straps in a cylindrical shape having the central strap disposed between the other two straps and the free end of said central strap is spaced circumferentially from the joined end. The inner surface of the cylindrical form has a friction material bonded thereto and an operating lug is integrally formed or otherwise secured on the free end of each strap.

These and other objects and advantages of the present invention will be apparent from the following description and drawings in which:

FIGS. 1 through 8 show a brake band manufacture process;

FIGS. 1a, 1b and 2a describe an alternate embodiment of a portion of the process;

FIGS. 9 and 10 show a further process embodiment and band structure; and

Figure 12:
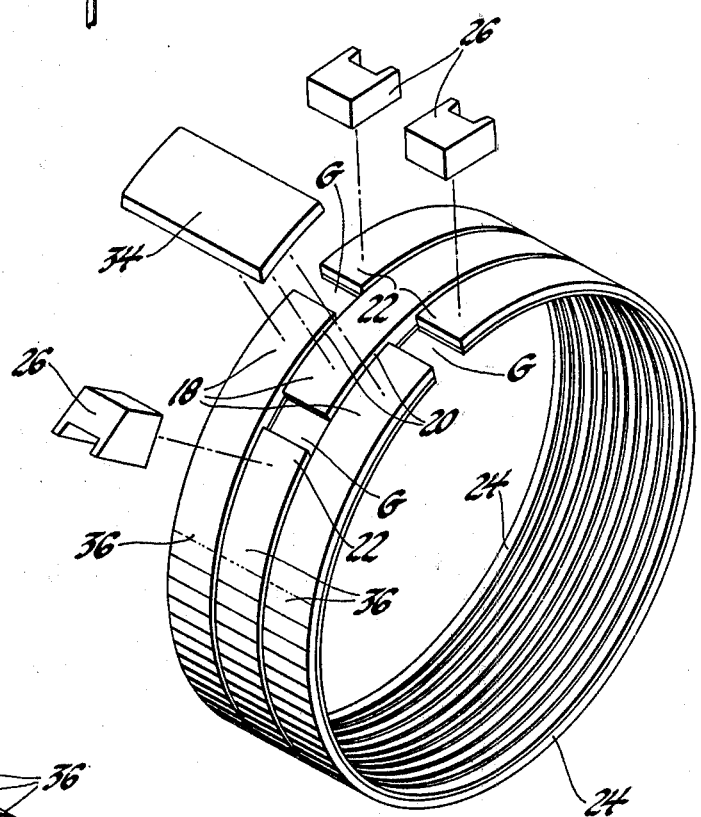
Figure 13:
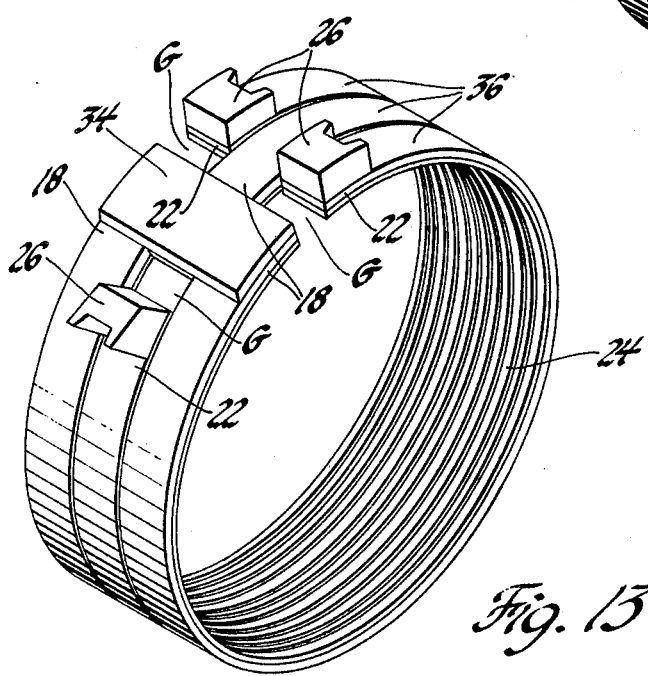

FIGS. 11, 12 and 13 describe another process for constructing a double wrap band.

Referring to the drawings, wherein like characters represent the same or corresponding parts throughout the several views, there is seen in FIG. 1, a coil 10 of base material in strip form, which is preferably steel. The base material is uncoiled to form a linear member 12 which is operated on by a shear or cutting blade 14 thereby providing a predetermined strap 16 having a length "L".

As seen in FIG. 2, three of the straps 16 having a length "L" and width "W" are disposed in a tuning fork or "Y" shape such that the longitudinal axis of the straps are parallel and one end 18 of each strap overlaps the end 18 of the adjacent strap. The central strap 16 extends in a direction opposite to the two outer straps. The three straps 16 are then bonded, preferably by welding, along their adjacent surface 20. After being welded, the straps 16 are formed into a cylindrical shape such that the bonded ends 18 are spaced from the free ends 22 by a gap "G". As best seen in FIG. 5, this gap is consistent for all three of the straps.

A friction material 24 is bonded to the inner surface of each strap 16, as seen in FIG. 6. After the addition of friction material 24, an operating lug 26 is secured to the outer surface of free end 22 of each strap 16.

The double wrap brake band, as shown in FIGS. 7 and 8, can be utilized as a brake device in a power transmission in a manner similar to that shown in above-mentioned U.S. Pat. Nos. 3,531,849 and 2,867,898. If desirable, during the cylindrical shaping, as seen in FIGS. 4 and 5, the band thus formed can be stretched to take a permanent set in the material such that proper sizing is obtained.

There is shown in FIGS. 1a and 1b a strap member 16a which, when sheared from coil 10, has excess length 28. This excess length 28 is pierced at 30 and then folded back on strap 16a, as shown in FIG. 1b, to form an operating lug 26a. The free end of operating lug 26a is secured on the surface of strap 16a by welding at 32. The straps 16a are then placed in the tuning fork shape, as seen in FIG. 2a after which the process described above for FIGS. 3 through 6 may be performed. The addition of operating lugs, as described above for FIGS. 7 and 8 will not be necessary.

FIGS. 9 and 10 show a double wrap brake band which is constructed in accordance with either FIGS. 1 through 8 or with FIGS. 1a, 1b, 2a and 3 through 6. One additional element is added to the brake band and that is a tie bar 34 which is welded across the ends 18 of each band 16 or 16a. This tie bar 34 increases the strength of the brake band such that higher torque loadings during operation in the transmission can be absorbed. The lugs 26, shown in FIGS. 9 and 10, can also be formed as lugs 26a described above for FIG. 1a.

It will also be appreciated that the operating lugs 26 can be secured to each strap 16 prior to the cylindrical forming shown in FIGS. 4 and 5 or after cylindrical forming and prior to the bonding of friction surface 24, as shown in FIG. 6. The most important feature of the process is that the individual straps 16 are formed from a single coil of base material with a simple shearing operation, thus eliminating the need for blanking to provide the tuning fork shape or cutting to provide the individual band members as required by the prior art.

FIGS. 11 through 13 depict an alternative embodiment in which hoops 36 having a gap "G" are shaped from the straps 16 or directly from the coil 10, as seen in FIG. 11, prior to being assembled in the cylindrical shape. The hoops 36 are arranged such that the gap "G" of the central hoop is angularly displaced from the gaps "G" of the outer hoops. As seen in FIG. 12, this places one end 18 of each hoop 36 in axial overlap with the adjacent hoop 36. The hoops 36 are then secured together, preferably by welding, to form a unitary cylindrical body. The securing can be accomplished along adjacent circumferentially extending edges 20 or through use of a tie bar 34. An operating lug 26 is secured to the outer surface of each hoop 36 adjacent the remaining free end 22.

The friction material 24 can be bonded to each hoop 36 either before or after the forming of the unitary cylindrical body. It is also possible to bond a friction material, using a sintering process, to each strap 16 prior to forming the hoops 36. The use of sintered friction materials for brakes is a well-known expedient.

The embodiment shown in FIGS. 11 and 12 permits the use of a forming machine programmed to operate on a 360° cycle. The other embodiment shown requires the forming machine to operate on a 720° cycle or on a machine which will bend the straps 16 simultaneously but in opposite directions of rotation. Thus, the embodiment shown in FIG. 12 is the most easily produced and for that reason is considered to be the preferred embodiment.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A method of making a double wrap band comprising the steps of: forming a plurality of hoops each having a gap therein, from a constant width base material; aligning three hoops coaxially with the gaps in the outer hoops being angularly displaced from the gap of the central hoop; welding adjacent hoops at a location between the gaps of respective hoops to form a unitary double wrap cylindrical band; and attaching an operating lug to each hoop adjacent the gap at the respective free end of each hoop.

2. A method of making a double wrap band comprising the steps of: forming a plurality of hoops each having a gap therein, from a base material; aligning three hoops coaxially with the gaps in the outer hoops being angularly displaced from the gap of the central hoop; locating a tie bar across the three aligned hoops between the gaps of adjacent hoops; welding a tie bar to the three aligned hoops at a location between the gaps of the hoops to form a unitary double wrap cylindrical band; and attaching an operating lug to each hoop adjacent the gap at the respective free end of each hoop.

* * * * *